United States Patent
Adogla

(10) Patent No.: US 9,665,387 B2
(45) Date of Patent: May 30, 2017

(54) USER-INFLUENCED PLACEMENT OF VIRTUAL MACHINE INSTANCES

(71) Applicant: Amazon Technologies, Inc., Seattle, WA (US)

(72) Inventor: Eden Grail Adogla, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 609 days.

(21) Appl. No.: 13/889,907

(22) Filed: May 8, 2013

(65) Prior Publication Data

US 2014/0337832 A1 Nov. 13, 2014

(51) Int. Cl.
*G06F 9/455* (2006.01)

(52) U.S. Cl.
CPC ...... *G06F 9/45558* (2013.01); *G06F 9/45533* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,587,336 B1 | 9/2009 | Wallgren et al. | |
| 8,185,894 B1 * | 5/2012 | Watson et al. | 718/1 |
| 8,261,295 B1 | 9/2012 | Risbood et al. | |
| 8,370,312 B1 * | 2/2013 | Sawhney | H04L 67/1097 707/694 |
| 2006/0152756 A1 | 7/2006 | Fellenstein et al. | |
| 2009/0276771 A1 | 11/2009 | Nickolov et al. | |
| 2009/0282404 A1 | 11/2009 | Khandekar et al. | |
| 2009/0292654 A1 | 11/2009 | Katiyar et al. | |
| 2010/0268567 A1 | 10/2010 | Snow et al. | |
| 2010/0269109 A1 | 10/2010 | Cartales | |
| 2011/0055034 A1 | 3/2011 | Ferris et al. | |
| 2011/0307291 A1 * | 12/2011 | Rolia et al. | 705/7.25 |
| 2012/0260248 A1 | 10/2012 | Katiyar et al. | |
| 2012/0284410 A1 | 11/2012 | Dudek et al. | |

(Continued)

FOREIGN PATENT DOCUMENTS

JP  2011523472  8/2011
JP  201345264  3/2013

OTHER PUBLICATIONS

Office Action for U.S. Appl. No. 13/889,914, mailed on Mar. 4, 2015, Eden Grail Adogla, "User-Influenced Placement of Virtual Machine Instances", 24 pages.

(Continued)

*Primary Examiner* — Emerson Puente
*Assistant Examiner* — Jonathan R Labud
(74) *Attorney, Agent, or Firm* — Lee & Hayes, PLLC

(57) ABSTRACT

A service provider network includes functionality for allowing a customer to influence the placement of virtual machine instances on server computers by specifying a placement strategy. Placement strategies may be shared among customers of the service provider network, and the placement strategies and the publishers of the placement strategies might be rated. Vendor-agnostic placement strategies might also be utilized to identify a service provider network for executing a virtual machine instance. A placement strategy that includes dynamically evaluated parameters might also be utilized to modify virtual machine instances in a customer fleet on an ongoing basis.

17 Claims, 10 Drawing Sheets

(56) References Cited

U.S. PATENT DOCUMENTS

| | | |
|---|---|---|
| 2013/0013691 A1 | 1/2013 | Whitnah et al. |
| 2013/0055251 A1 | 2/2013 | Anderson et al. |
| 2013/0060919 A1 | 3/2013 | Khandekar et al. |
| 2013/0073730 A1 | 3/2013 | Hansson et al. |
| 2013/0086235 A1 | 4/2013 | Ferris |
| 2013/0097601 A1* | 4/2013 | Podvratnik et al. ............. 718/1 |
| 2013/0111468 A1 | 5/2013 | Davis et al. |
| 2013/0227558 A1* | 8/2013 | Du et al. ........................... 718/1 |
| 2013/0263209 A1 | 10/2013 | Panuganty |
| 2013/0268672 A1* | 10/2013 | Justafort ................. H04L 67/10 709/226 |
| 2013/0304903 A1 | 11/2013 | Mick et al. |
| 2014/0278808 A1 | 9/2014 | Iyoob et al. |

OTHER PUBLICATIONS

The PCT Search Report and Written Opinion mailed Mar. 27, 2015 for PCT application No. PCT/US14/37291, 10 pages.

Office Action for U.S. Appl. No. 13/889,919, mailed on May 7, 2015, Eden Grail Adogla, "User-Influenced Placement of Virtual Machine Instances", 9 pages.

U.S. Appl. No. 13/679,451, filed Nov. 16, 2012, Adogla.

Office action for U.S. Appl. No. 13/889,914, mailed on Jul. 16, 2015, Adogla, "User-Influenced Placement of Virtual Machine Instances", 22 pages.

Office action for U.S. Appl. No. 13/889,919, mailed on Nov. 2, 2015, Adogla, "User-Influenced Placement of Virtual Machine Instances", 9 pages.

The Australian Office Action mailed Jul. 8, 2016 for Australian Patent Application No. 2014262679, a counterpart foreign application of U.S. Appl. No. 13/889,907, 3 pages.

The Canadian Office Action mailed Jul. 21, 2016 for Canadian patent application No. 29112614, a counterpart foreign application of U.S. Appl. No. 13/889,907, 4 pages.

The Extended European Search Report mailed Nov. 10, 2016 for European Patent Application No. 14794136.3, 8 pages.

The Singapore Office Action mailed Sep. 26, 2016 for Singapore Patent Application No. 11201508971U, a counterpart foreign application of U.S. Appl. No. 13/889,907, 5 pages.

Office action for U.S. Appl. No. 113/889,914, mailed on Jun. 24, 2016, Adogla, "User-Influenced Placement of Virtual Machine Instances", 20 pages.

Office action for U.S. Appl. No. 13/889,914, mailed on Jan. 5, 2016, Adogla, "User-Influenced Placement of Virtual Machine Instances", 21 pages.

The Singapore Office Action mailed Feb. 22, 2016 for Singapore Patent Application No. 11201508971U, a counterpart foreign application of U.S. Appl. No. 13/889,907, 6 pages.

Office action for U.S. Appl. No. 13/889,919, mailed on Mar. 11, 2016, Adogla, "User-Influenced Placement of Virtual Machine Instances", 7 pages.

Translated Japanese Office Action mailed Feb. 14, 2017 for Japanese patent application No. 2016-513067, a counterpart foreign application of U.S. Appl. No. 13/889,907, 6 pages.

Tamaki, "Upcoming 'App Marketplaces'", Nikkei Computer, No. 777, pp. 110-111, Nikkei Business Publications, Inc., Japan, Mar. 3, 2011.

* cited by examiner

USER-INFLUENCED PLACEMENT OF VIRTUAL MACHINE INSTANCES

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

When launching certain types of computing resources, such as virtual machine instances, customers of service provider networks such as those described above are typically unable to specify details about the actual hardware and software platform (which might be also be referred to herein as an "infrastructure platform") upon which the computing resource is instantiated. Rather, the customer might only be permitted to generically describe the desired computing resource. For example, in the case of virtual machine instances, a customer might be permitted to specify only the desired amount of memory, the desired level of processing capability, and a desired amount of storage. The network-based computing service then selects a particular hardware platform, such as a particular server computer, to utilize to instantiate the computing resource requested by the customer.

The disclosure made herein is presented with respect to these and other considerations.

DETAILED DESCRIPTION

Figure 1:
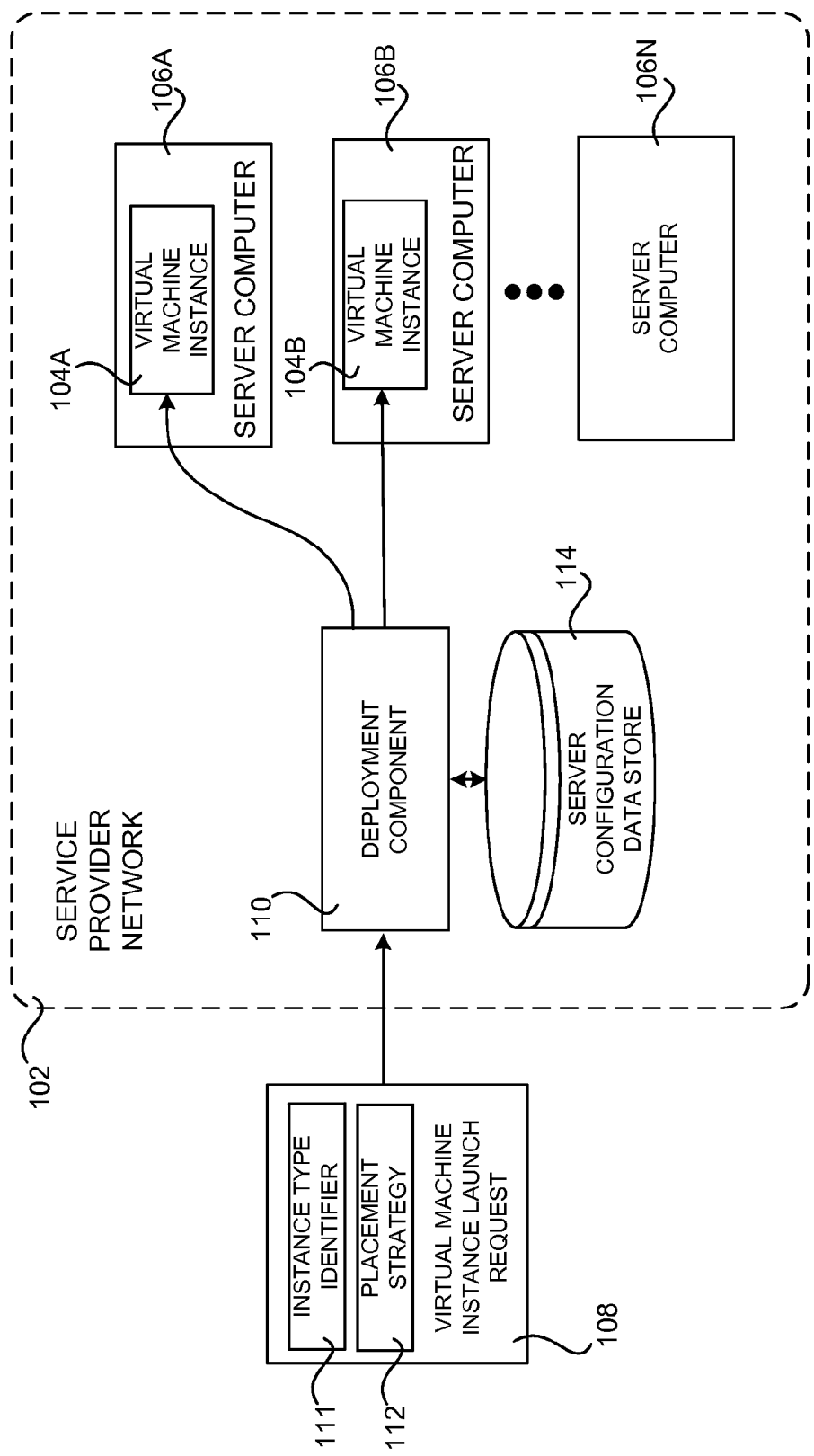
FIG. 1 is a network architecture diagram showing aspects of one illustrative mechanism described herein for user-influenced placement of virtual machines using placement strategies in a service provider network, according to one embodiment disclosed herein.

The following detailed description is directed to technologies for user-influenced placement of virtual machine instances. Utilizing the technologies described herein, placement strategies can be defined and utilized to influence placement of virtual machine instances and other types of computing resources in a service provider network. The placement strategies might be shared between customers of the service provider network, and placement strategies and the publishers of the placement strategies might be rated. In other embodiments, a vendor-agnostic placement strategy might be utilized to select a service provider network for instantiating a virtual machine instance. In yet another embodiment, a placement strategy that includes dynamically evaluated parameters might be utilized to modify virtual machine instances in a customer fleet.

The various mechanisms disclosed herein for user-influenced placement of virtual machine instances using placement strategies might operate in conjunction with a service provider operated network-based distributed computing environment (which may be referred to herein as a "service provider network") through which customers can purchase and utilize computing resources such as virtual machine instances, data storage resources, database resources, networking resources, and other types of computing resources on a permanent or as-needed basis.

The service provider operating the service provider network may charge a fee for operating the computing resources to the customer that creates and uses the resources. The service provider might also utilize various purchasing models to determine how much to charge the customer for the use of computing resources provided by the service provider. As mentioned above, customers of such a service provider can utilize the computing resources as building blocks to create custom solutions that provide various types of functionality, such as application hosting, backup and storage, content delivery, Web hosting, enterprise IT solutions, database services, and others.

As also mentioned above, customers of service provider networks such as those described above are typically unable to specify details about the actual hardware platform upon which a particular computing resource is instantiated. Rather, the customer might only be permitted to generically describe the desired computing resource. For example, in the case of virtual machine instances, a customer might be permitted to specify only the desired amount of memory, the desired level of processing capability, and a desired amount of storage. The customer cannot, however, specify the particular hardware or infrastructure platform that the virtual machine instance should be created on. Rather, the network-based computing service selects the particular hardware platform, such as a particular server computer, to utilize to instantiate the computing resource requested by the customer. The various embodiments disclosed herein address these and potentially other considerations.

In order to address at least some of the considerations set forth above, the embodiments disclosed herein provide several computer-implemented mechanisms for user-influenced placement of virtual machine instances using placement strategies. In these embodiments, a service provider network might provide functionality for user-influenced placement of virtual machine instance and/or other types of computing resources. For example, a customer of a service provider network might be permitted to specify a placement strategy that can be utilized to influence the placement of a virtual machine instance, or other type of computing resource, on a particular hardware platform in the service provider network. A placement strategy might be utilized to influence the placement of a virtual machine instance on a particular hardware platform based upon price, hardware manufacturer, the year that the hardware platform was manufactured, a chipset, a hardware card or other type of peripheral, network connection, a processor type, and/or other attributes of a computing device.

In one particular embodiment disclosed herein, customers of a service provider network may be permitted to share placement strategies with one another. For example, a component within the service provider network might be configured to receive placement strategies from customers of the service provider network. The received placement strategies might be defined as being suitable for use with a particular type of computing workload, such as a particular virtual machine image. The placement strategies might be stored and later utilized to recommend placement strategies to other customers of the service provider network for use with the same or a similar computing workload.

Mechanisms might also be provided for allowing customers to provide ratings of placement strategies and/or the customers that provide the placement strategies. These ratings might also be utilized when selecting a placement strategy to recommend to a customer for use with a particular workload. These ratings might also be exposed to customers of the service provider network for use in selecting a placement strategy for a particular type of computing workload.

In another embodiment, a mechanism is provided for user-influenced placement of virtual machine instances using vendor-agnostic placement strategies. In this embodiment, a vendor-agnostic placement strategy may be defined and utilized to select a particular service provider for executing a virtual machine instance. A vendor-agnostic placement strategy is a placement strategy that is defined in a manner that is independent (i.e. agnostic) of any particular service provider (i.e. vendor) and/or service provider network.

In one implementation, an instance placement service retrieves instance availability data and instance pricing data for a multitude of service provider networks operated by different vendors. The instance availability data describes virtual machine instance types and/or hardware platforms for executing the virtual machine instance types available from each service provider network. The instance pricing data describes the price for utilizing the various virtual machine instance types. The instance availability data and the instance pricing data might be obtained prior to receiving a request to launch a virtual machine instance or at the time such a request is received.

The instance placement service might also receive a request to launch a virtual machine instance that includes a vendor-agnostic placement strategy. In response to receiving such a request, the instance placement service may utilize the instance availability data, the instance pricing data, and the vendor-agnostic placement strategy to select a service provider network for launching the virtual machine instance. In one embodiment, the service provider network that is selected for launching the virtual machine instance is the service provider network that can satisfy the parameters of the vendor-agnostic placement strategy and that can also execute the desired virtual machine instance at the lowest cost. Once a service provider network has been selected, the instance placement service may transmit a request to the selected service provider network to instantiate the virtual machine instance.

In yet another embodiment, a mechanism is provided for user-influenced placement of virtual machine instances using dynamic parameters. In this embodiment, a placement strategy might be defined that includes dynamically evaluated parameters. Dynamically evaluated parameters are parameters that are dynamically defined at the time that the placement strategy is evaluated. For example, values for one or more dynamically evaluated parameters might be retrieved from a data source internal to a service provider network at the time a placement strategy is evaluated. Values for one or more dynamically evaluated parameters might also be retrieved from a data source external to the service provider network at the time a placement strategy is evaluated.

Once the values for the dynamically evaluated parameters for a placement strategy have been received, the placement strategy can be evaluated. Depending upon the results of the evaluation, various modifications might be made to a fleet of virtual machine instances operated by a customer of a service provider network. For example, a virtual machine instance executing on a particular hardware platform might be migrated to a different hardware platform. In another example, a new virtual machine instance might be added to the fleet that is executed on a hardware platform specified by the placement strategy containing the dynamically evaluated parameters.

In some embodiments, the values for the dynamically evaluated parameters might be periodically updated and utilized to evaluate the placement strategy. The virtual machine instances in the customer fleet may then be updated accordingly depending upon the results of the evaluation of the placement strategy. In this way, modifications to a customer fleet can be made on an ongoing basis according to the parameters set forth in the placement strategy. Additional details regarding the various components and processes described briefly above for user-influenced placement of virtual machine instances will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram showing aspects of one illustrative mechanism described herein for user-influenced placement of virtual machine instances. As described briefly above, the various mechanisms disclosed herein might operate in conjunction with a service provider network 102, in which customers can purchase and utilize computing resources (which might also be referred to herein as "resources"), such as the virtual machine instances 104A-104B (which might also be referred to herein as "virtual machines" or "instances" 104), networking resources, storage resources, or other types of computing resources, from a service provider that operates the service provider network 102 on a permanent or as-needed basis. Although the description presented herein with regard to FIG. 1 is described primarily in the context of virtual machine instances 104, it should be appreciated that the embodiments disclosed herein might be utilized with other types of computing resources.

Each type or configuration of a computing resource may be available from the service provider that operates the service provider network 102 in different sizes. For example, a service provider might offer the instances 104 or other types of data processing resources that are available for purchase and use that have many different configurations of processor capabilities, main memory, disk storage, and operating system. A service provider might also offer other types of resources for purchase and use by customers. For example, a service provider might offer database resources, file or block data storage resources, networking resources, and/or other types of resources on a permanent or as-needed basis.

The service provider operating the service provider network 102 might also charge a fee for operating the resources to the customer that creates and uses the resources. The fee charged for a particular resource might be based upon the type and/or configuration of the resource. The fee charged for a particular resource might also be based upon the amount of time the resource is utilized. For example, in the case of a data processing resource, like a virtual machine instance 104, the fee for use of the resource might be charged based upon the configuration of the virtual machine instance 104 and the amount of time the virtual machine instance 104 is utilized. In the case of a data storage resource, the fee might be computed based upon the amount of data stored and/or the amount of data transferred into or out of the resource. The fees for other types of resources might also be based upon other considerations. A service provider might also utilize various purchasing models to determine the amount to charge a customer for use of resources provided by the service provider.

The resources described above may be provided in one particular implementation by one or more data centers operated by the service provider. As known to those skilled in the art, data centers are facilities utilized to house and operate computer systems, such as the server computers 106A-106N, and associated components. Data centers also typically include redundant and backup power, communications, cooling, and security systems. The data centers might be located in geographically disparate locations, and might also be connected to various other facilities, such as co-location facilities, and various wide area networks ("WANs"), such as the Internet. In the environment shown in FIG. 1, a service provider might operate one or more data centers configured to provide the virtual machine instances 104 in the service provider network 102 to its customers. Details regarding the implementation of a service provider network 102 for providing the functionality disclosed herein will be provided below with regard to FIGS. 8 and 9.

The various resources described above might also be provisioned and de-provisioned as needed in an automated fashion. For example, a customer might submit a virtual machine instance launch request 108 (a "launch request 108" or "request 108") to the service provider network 102 to instantiate a new instance 104A of a virtual machine. In response to receiving such a request 108, a deployment component 110, or one or more other components within the service provider network 102, might create the new instance 104A of the virtual machine as requested by the customer. The customer may then be permitted to utilize the new instance 104A of the virtual machine as desired. Other types of computing resources might be instantiated in a similar fashion.

When a customer has finished using a computing resource, such as the virtual machine instance 104A, the customer may request that the resource be de-provisioned. In response thereto, the deployment component 110, or another component in the service provider network 102, may cause the computing resources to be de-provisioned. For example, the deployment component 110 might de-provision the virtual machine instance 104A. Other types of computing resources might also be provisioned and de-provisioned in a similar manner. The service provider network 102 might also provide functionality for automatically scaling and/or de-scaling resources based upon demand for the computing resources or other factors.

As mentioned above, the service provider network 102 might also provide functionality in some embodiments for user-influenced placement of virtual machine instances 104. For example, a customer of the service provider network 102 might be permitted to specify one or more additional parameters (referred to herein as a "placement strategy 112") that can influence the placement of a virtual machine instance 104 or other type of computing resource on a particular hardware platform meeting customer-specified criteria. For example, the customer may be permitted to influence the placement of a virtual machine instance 104 on a particular type of server computer 106 based upon price, hardware manufacturer, the year that the hardware platform was manufactured, a chipset, a hardware card or other type of peripheral, network connection, a processor type, and/or other attributes of a hardware or infrastructure platform. Using such a mechanism, a network-based service provider may be able to charge higher prices for the use of the newer hardware platforms. Alternatively, customers of such a network-based service provider may be able to cut costs by instantiating computing resources on more out-of-date, or less desirable, hardware platforms.

In one implementation, the functionality for influencing the placement of a virtual machine instance 104 is implemented through the use of a service application programming interface ("API") call through which a customer can specify a placement strategy 112 that defines a desired hardware platform. For instance, an example API call might allow customers of the service provider network 102 to provide guidance on the placement of a virtual machine instance 104 on a server computer 106 having certain types of hardware or meeting other criteria. For example, an API call to request a certain virtual machine instance type having a certain amount of memory might include a placement strategy 112 that specifies the desired manufacturer or year or manufacture of the hardware upon which the virtual machine instance 104 will be executed. For example, the placement strategy might be utilized to specify that a server computer 106 having a processor from ADVANCED MICRO DEVICES ("AMD") or that a server computer 106 manufactured in the year 2012 be utilized. Mechanisms other than an API might also be utilized to provide a placement strategy 112 to the proper component in the service provider network 102. In some implementations, a placement strategy 112 might also be specified that identifies other software components that should not be simultaneously executed on a desired infrastructure platform and/or specify that a certain percentage (e.g. 100%) of certain hardware resources be dedicated to the instance.

In some implementations, users may be permitted to register default placement strategies 112 or to specify a placement strategy 112 that is utilized at the time a virtual machine instance 104 is launched. The deployment component 110 can attempt to honor the user-specified placement strategy 112 or can fail to launch the requested virtual machine instance 104 if the specified placement strategy 112 cannot be satisfied. For example, a launch request 108 may be denied if the associated placement strategy 112 specifies that a certain processor type be utilized and no server computers 106 are available in the service provider network 102 having the desired processor type.

In other embodiments, a placement strategy 112 can also be utilized with auto-scaling functionality provided by the service provider network 102. For example, a placement strategy 112 might specify that hardware manufactured in the year 2011 be utilized and, if that hardware is not available, then utilize hardware manufactured in 2010 and increase production capacity by 10% to compensate for known issues with 2010 hardware. This functionality can also be combined with predefined benchmarking to perform fractional vertical scaling of workloads to match generational instance-sizes. For example, a placement strategy 112 might specify to launch a virtual machine instance 104 on hardware manufactured in 2010, but if that is not possible, then use hardware manufactured in 2011, but increase workload sent to each server computer 106 manufactured in 2011 by 10% to offset the cost of using the newer hardware.

In the example shown in FIG. 1, a customer of the service provider network has submitted a launch request 108 to the deployment component 110. The launch request 108 requests that the deployment component 110 instantiate a new instance 104 of a virtual machine in the service provider network 102. The launch request 108 might include an instance type identifier 111 that generally specifies the type of virtual machine instance 104 that is requested. For example, the instance type identifier 111 might generally specify a desired amount of memory, a desired level of processing capability, and a desired amount of storage for the new virtual machine instance 104. The instance type identifier 111, however, does not specify specific details about the actual hardware platform that the new instance 104 should be created on.

As mentioned above, the launch request 108 might also include a user-defined placement strategy 112. The placement strategy 112 may be included in the launch request 108 in some embodiments, or it may be provided separately in other embodiments. For example, in some implementations a customer of the service provider network 102 might maintain a placement strategy 112 associated with a user account that can be accessed and utilized when the deployment component 110 receives a request 108 to instantiate a new virtual machine instance 104 for the customer.

It should be appreciated that the placement strategy 112 may define alternate preferences for a particular infrastructure platform that might be evaluated until an available infrastructure platform is identified. For example, in one particular implementation, the placement strategy 112 might be defined that includes a first preference for hardware manufactured in the year 2013. The placement strategy 112 might also specify that if hardware manufactured in the year 2013 is not available, then hardware manufactured in 2012 should be utilized. The placement strategy 112 might further specify that if hardware manufactured in 2012 is not available, then any server computer 106 that includes a chipset from INTEL CORPORATION ("INTEL") be utilized. If a server computer having a chipset from INTEL is unavailable, the placement strategy 112 might further specify that no instance 104 should be launched. In this way, a customer of the service provider network 102 can specify a multitude of infrastructure platform candidates so as to influence placement of virtual machine instances 104 or other types of computing resources in the service provider network 102.

It should be appreciated that even more complex placement strategies 112 than those described above can be defined and utilized. Generally, however, it should be appreciated that the placement strategy 112 can be defined as an ordered list of desired infrastructure attributes. The list might be evaluated in preferential order in the manner described above until a server computer 106 or other hardware platform having the desired attribute, or attributes, is identified. The desired infrastructure attributes may take different formats in different embodiments, such as a set of key-value-pair constraints that must all be satisfied for a server computer 106 to be considered as being selectable by this preference, a free-form text statement involving Boolean operators, or a specific virtual machine instance type 104 with predetermined and published properties. Other formats might also be utilized.

As mentioned briefly above, the deployment component 110 receives the launch request 108 in one implementation. The deployment component 110 then identifies which server computer 106A-106N the requested virtual machine instance 104 will be launched upon. It should be appreciated that the server computers 106A-106N may utilize a variety of different infrastructure platforms, which can include hardware platforms, software platforms and/or their respective configurations. For example one server computer 106A might utilize a particular processor and chipset, while another server computer 106B might utilize a different processor and chipset. The server computers 106A-106N might also be manufactured during different years. The server computers 106A-106N might also have different operating systems or other software components installed thereupon. In this regard, it should be appreciated that server computers 106A-106N having many different hardware and software configurations may be made available in the server provider network 102 for use in the manner described herein.

When the deployment component 110 receives a launch request 108, the deployment component 110 may utilize the placement strategy 112 and the contents of a server configuration data store 114 (the "data store 114") to determine which of the server computers 106A-106N upon which to instantiate the new virtual machine instance. The data store 114 includes data identifying the server computers 106A-106N available in the service provider network 102, along with data for each of the server computers 106A-106N describing the details of the infrastructure platform of each server computer. For example, the data store 114 might store data for each of the server computers 106A-106N identifying the type and manufacturer of hardware and software components in the server computer 106, the year of manufacture of the hardware components, the version of the software components, the price for use of the particular server computer 106, and other types of hardware and/or software attributes. It should be appreciated that these examples are merely illustrative and that data describing other hardware and/or software attributes of the server computers 106A-106N might be maintained in the data store 114.

The deployment component 110 utilizes the placement strategy 112 and the data stored in the data store 114 to identify one or more server computers 106 that satisfy the user-specified placement strategy 112. Once one or more server computers 106 have been identified that satisfy the placement strategy 112, the deployment component 110 can then launch the requested virtual machine instance 104 or other type of computing resource on the matching server computer, or server computers 106.

In another implementation, the deployment component 110 might respond to the launch request 108 with various types of information. For example, if the server 106A is found to be a match for the placement strategy 112, then data describing the price for utilizing the server computer 106A can be returned in response to the launch request 108. The customer can then utilize the price information to decide whether or not to launch the virtual machine instance 104A on the server computer 106A. Other information might also be returned in response to a launch request 108.

By providing a placement strategy 112 such as that described above, a customer of the service provider network 102 can influence where a particular virtual machine instance 104 or other type of computing resource is instantiated among many server computers 106 having different hardware and software configurations. Additional details regarding the mechanism described above for user-influenced placement of virtual machine instances 104 can be found in U.S. patent application Ser. No. 13/679,451, entitled "USER-INFLUENCED PLACEMENT OF VIRTUAL MACHINES", which was filed on Nov. 16, 2012, and which is expressly incorporated by reference herein in its entirety.

Figure 2:
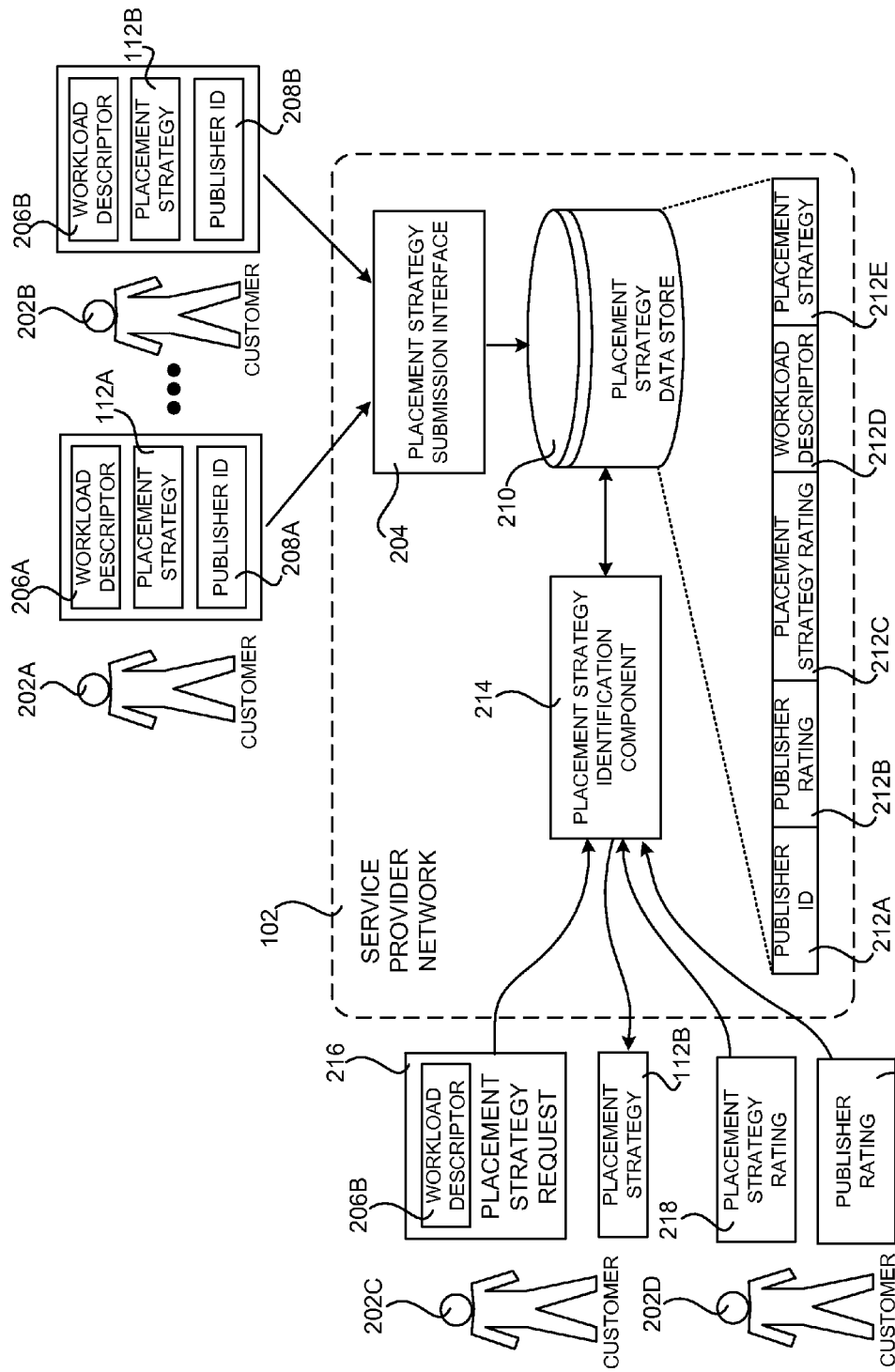
FIG. 2 is a system diagram showing aspects of one mechanism disclosed herein for sharing placement strategies, and for rating placement strategies and publishers of the placement strategies, according to embodiments disclosed herein.
Figure 3:
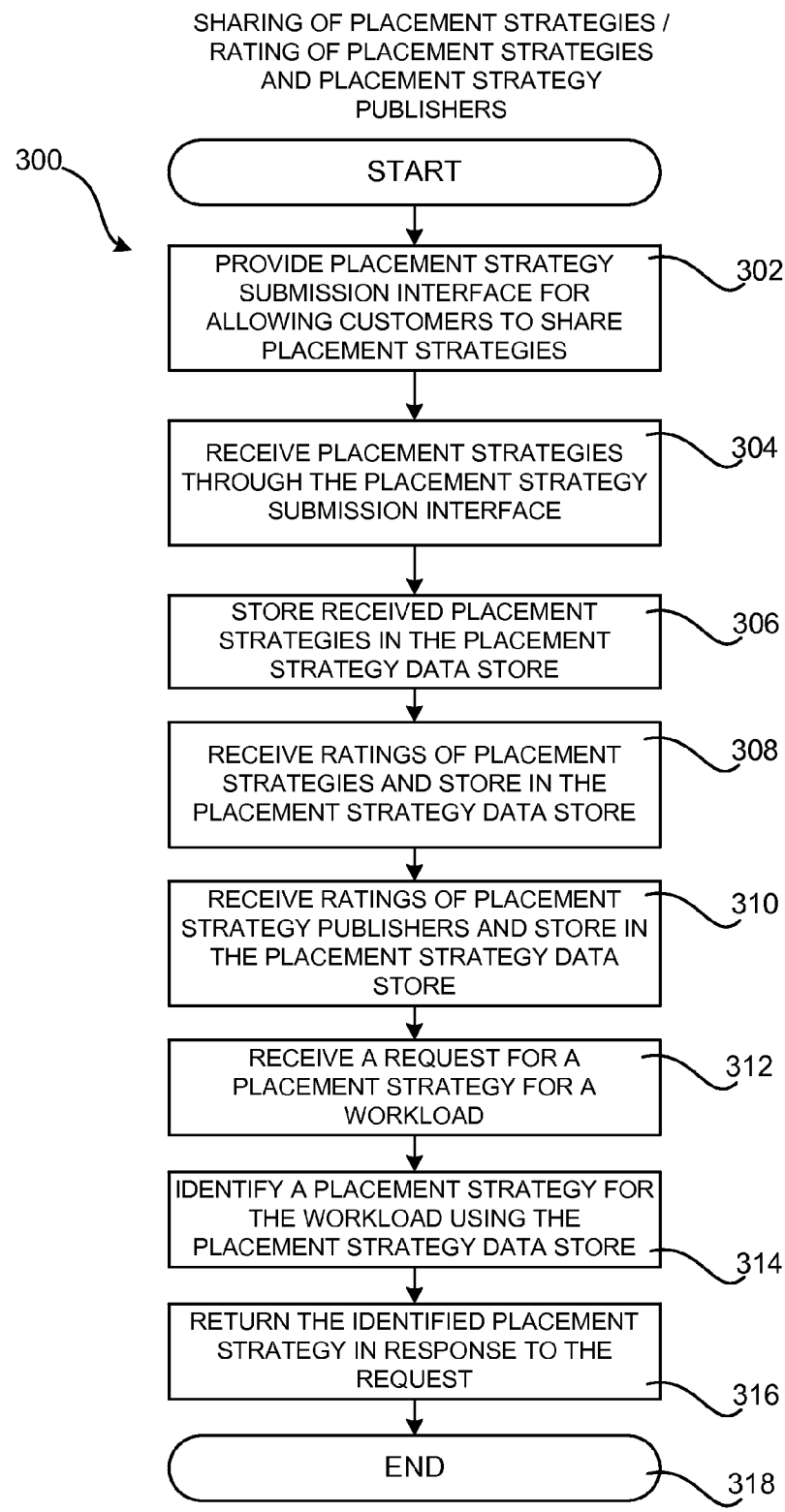
FIG. 3 is a flow diagram showing one illustrative routine for sharing placement strategies, and for rating placement strategies and the publishers of the placement strategies, according to one embodiment disclosed herein.

FIGS. 2 and 3 illustrate aspects of one embodiment disclosed herein wherein customers of the service provider network 102 are permitted to share placement strategies 112 with one another. This may be desirable, for instance, when a customer has determined that a particular placement strategy 112 works well for selecting a hardware platform for executing a particular type of computing workload.

A computing workload (which might be referred to as a "workload") is an application, virtual machine image, virtual appliance, or another type of program that can be executed on a virtual machine. A placement strategy 112 might be considered to work well with a particular type of workload if the placement strategy 112 causes the workload to be placed on server computers 106 that are optimized for the workload. Whether a server computer 106 is optimized for a workload might be based upon one or more factors defined by a customer of the service provider network 102 including, but not limited to, cost, application performance, throughput, number of virtual machine instances 104 used, and/or other factors or combinations of factors.

If a customer of the service provider network 102 determines that a particular placement strategy 112 works well for a particular workload, then the customer might like to share the placement strategy 112 with other customers so that the other customers do not have to engage in the sometimes-difficult task of creating an optimal placement strategy 112 for a particular workload. In some embodiments, a customer that shares a placement strategy 112 (such a customer might be referred to herein as a "publisher") might be compensated when other customers use the shared placement strategy 112. Additional details regarding the various embodiments disclosed herein for sharing placement strategies 112 will be provided below with regard to FIGS. 2 and 3.

As shown in FIG. 2, the service provider network 102 includes a placement strategy submission interface 204 (the "interface 204") in one embodiment. The interface 204 might be a user interface ("UI"), an API, or another type of interface through which customers 202 of the service provider network 102 can submit placement strategies 112 that are to be shared with other customers 202. When a customer submits a placement strategy 112 to the interface 204, the customer also provides a workload descriptor 206. The workload descriptor 206 defines the type of workload that the submitted placement strategy 112 is configured for use with. As mentioned above, a workload is an application, virtual machine image, virtual appliance, or another type of program that can be executed on a virtual machine. The customer 202 submitting the placement strategy 112 might also provide a publisher identifier ("ID") 208. The publisher ID 208 identifies the customer 202 that is sharing the placement strategy 112.

In the example shown in FIG. 2, for instance, a customer 202A has submitted a placement strategy 112A, a corresponding workload descriptor 206A, and a publisher ID 208A identifying the customer 202A to the interface 204. Similarly, the customer 202B has submitted a placement strategy 112B, a corresponding workload descriptor 206B, and a publisher ID 208B identifying the customer 202B to the interface 204. The interface 204 receives the submissions from the customers 202A and 202B and stores the submitted data in a placement strategy data store 210 (the "data store 210").

The data store 210 is a database or other type of storage system configured to store placement strategies 112 submitted by customers 202 of the service provider network 102. As will be described in greater detail below, the data store 210 might also store placement strategies 112 identified in other ways. In one particular embodiment, the data store 210 includes records having fields 212A-212E. The field 212E is utilized to store a placement strategy 112 or data identifying a placement strategy 112. The field 212D is utilized to store the workload descriptor 206A corresponding to the placement strategy 112 identified in the field 212E. The field 212A is utilized to store data identifying the customer 202 that submitted the placement strategy 112 identified in the filed 212E.

As will be described in greater detail below, customers 202 of the service provider network 102 might also be permitted to provide a rating for placement strategies 112 and for the publishers of placement strategies 112. As an example, a customer 202 of the service provider network 102 might be permitted to rate a placement strategy 112 and/or a publisher of a particular placement strategy 112 on a scale of 1-5, 1-10, 1-100, or in another manner. In these embodiments, the data store 210 might also be configured to store data defining the ratings for a particular placement strategy 112 and/or a publisher. For instance, the field 212C might be utilized to store data defining the rating for the placement strategy 112 identified in the field 212E. The field 212B might be utilized to store data defining the rating for the publisher of the placement strategy 112 identified in the field 212E. It should be appreciated that the data structure illustrated in FIG. 2 is merely illustrative and that other types of data structures, storage systems, and technologies might be utilized to store the data described above and/or other relevant data.

The service provider network 102 is also configured with a placement strategy identification component 214 (the "identification component 214") in one embodiment. The identification component 214 provides a UI, API, or another mechanism through which customers of the service provider network 102 can obtain a placement strategy 112 suitable for use with a particular type of workload. For instance, in the example shown in FIG. 2, a customer 202C has utilized a suitable computing device to transmit a placement strategy request 216 (the "request 216") to the identification component 214. The request 216 includes a workload descriptor 206C that identifies the workload for which the customer 202C is seeking a suitable placement strategy 112.

In response to receiving the request 216, the identification component 214 searches the contents of the data store 210 for the identity of a placement strategy 112 suitable for the workload identified by the workload descriptor 206B. For example, the identification component 214 might search the field 212 for a workload descriptor matching the workload descriptor 202C submitted in the request 216. In some embodiments, the identification component 214 might also utilize some of the other data stored in the data store 210 to select a placement strategy 112 in response to the request 216. For example, if multiple matches are found for the workload descriptor 206C, the identification component 214 might select a matching placement strategy 112 having the highest rating stored in the field 212C. As another example, the identification component 214 might select the placement strategy 112 having the highest publisher rating, as reflected in the field 212B. Other mechanisms might also be utilized to select a placement strategy 112 to return in response to the request 216.

In the example shown in FIG. 2, the identification component 214 has selected the placement strategy 112B as being suitable for the workload identified by the workload descriptor 206B. Accordingly, the identification component 214 has returned the placement strategy 112B, or a reference to the placement strategy 112B, in response to the request 216. The customer 202C may then utilize the returned placement strategy 112B to influence the placement of a virtual machine for handling the workload described by the workload descriptor 206B in the manner discussed above with regard to FIG. 1. As also mentioned above, the publisher of the returned placement strategy 112B (in this case, the customer 202B), might be compensated for the provision of the placement strategy 112B to the customer 202C. The publisher of a placement strategy 112 might also be compensated in other ways for the use of the placement strategy 112 by other customers 202.

As mentioned above, customers 202 of the service provider network 102 can submit ratings for placement strategies 112 and/or for publishers of placement strategies in some implementations. In these implementations, the identification component 214, or another component in or external to the service provider network 102, might provide a suitable UI, API, or other type of interface through which a customer 202 or other user can submit a rating for a placement strategy 112 and/or a publisher of a placement strategy 112. In the example shown in FIG. 2, for instance, the customer 202D of the service provider network 102 has submitting a rating 218 for a placement strategy 112 and a rating 220 for a publisher of a placement strategy 112. As also mentioned above, the provided ratings 218 and 220 might be stored in the data store 210 or in another location. The supplied ratings 218 and 220 might also be averaged, weighted, and/or modified in other ways to provide an appropriate rating measure for the placement strategies 112 and/or the publishers of the placement strategies 112.

It should be appreciated that the data stored in the data store 210 might also be utilized and/or exposed in other ways. For example, the placement strategy rating 218 for various placement strategies 112 might be exposed through a Web site or other type of user interface. Similarly, the publisher rating 220 of publishers of placement strategies 112 might also be exposed in a similar fashion. This information might assist customers 202 of the service provider network 102 when selecting a placement strategy 112 for a particular type of workload. This information might also be utilized in other ways.

As mentioned briefly above, placement strategies 112 might be added to the data store 210 in ways other than manual submission by the customers 202. In one particular embodiment, for instance, a component within the service provider network 102, such as the deployment component 110, might maintain historical data regarding the particular placement strategies 112 that are in use with certain types of workloads. Placement strategies 112 that are in use with a large number or percentage of a particular type of workload might be added to the data store 210. For example, the deployment component 110 might determine that a particular placement strategy 112 is utilized 65% of the time with a particular type of workload. In response to such a determination, the deployment component 110 might cause the placement strategy 112 to be added to the data store 210 for provision to customers in the manner described above. Various techniques, such as machine learning, might be utilized to determine that, over time, customers utilize certain infrastructure platforms for certain types of workloads. This information might then be utilized to determine an optimal placement strategy 112 for a particular workload.

Information defining the frequency at which a particular placement strategy 112 is utilized with a certain type of workload might also be utilized in other ways. For example, this information might be utilized by the operator of the service provider network 102 to encourage or discourage use of use of certain virtual machine instance types in the customer network 102. In particular, if the service provider network 102 determines that a customer 202 has requested to launch a virtual machine instance using a placement strategy 112 that specifies a rarely used or inappropriate hardware type, a component in the service provider network 102 might present the historical data to the customer and encourage the customer to utilize a different placement strategy 112 to launch the virtual machine instance.

In some embodiments, the placement strategies 112 identified in the data store 210 might be "benchmarked" in order to select a most optimal placement strategy 112 for a particular workload. For example, the workload might be instantiated on different infrastructure types utilizing different placement strategies 112. The performance of the workload on the different infrastructure types might then be measured, and the placement strategy 112 that specified the infrastructure type having the highest performance for the workload might be selected as the optimal placement strategy 112. Performance might be measured as absolute computational performance, as a price-to-performance ratio, based solely upon cost, or in another manner. The optimal placement strategy 112 for a particular workload might be selected in response to a request 216 for a placement strategy 112 for the workload in the manner described above.

FIG. 3 is a flow diagram showing one illustrative routine 300 for sharing placement strategies 112, and for rating placement strategies 112 and the publishers of the placement strategies 112, according to one embodiment disclosed herein. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the service provider network 102 provides the submission interface 204 described above for allowing customers 202 to share placement strategies 112. As mentioned above, the submission interface 204 might be a UI such as a Web site, an API, or another type of interface through which customers 202 or other users can submit placement strategies 112 to the service provider network 102.

From operation 302, the routine 300 proceeds to operation 304, where the submission interface 204 receives placement strategies 112. As mentioned above, a workload descriptor 206 might also be provided with each submitted placement strategy 112 that defines one or more workloads that the submitted placement strategy 112 is suitable for use with. The submission might also include a publisher ID 208 that identifies the user submitting the placement strategy 112. Other information might also be provided. From operation 304, the routine 300 proceeds to operation 306, where the submission interface 204 stores the submitted placement strategy 112 and other associated data, such as the workload descriptor 206, in the data store 210.

From operation 306, the routine 300 proceeds to operation 308, where the identification component 214, or another component within the service provider network 102, receives ratings 218 of placement strategies 112. The ratings 218 are then stored in the data store 210 in the manner described above. As also mentioned above, the ratings 218 might be averaged, weighted, or otherwise processed prior to or after storage in the data store 210. Ratings 220 for publishers of placement strategies 112 may be received and stored in a similar fashion at operation 310.

From operation 310, the routine 300 proceeds to operation 312, where the identification component 214 receives a request 216 for a placement strategy 112 for a particular workload. As mentioned above, the workload might be identified by a workload descriptor 206 in the request 216. In response to receiving the request 216, the routine 300 proceeds from operation 312 to operation 314, where the identification component 214 utilizes the supplied workload descriptor 206 and the contents of the data store 210 to select a placement strategy 112 suitable for the workload identified in the request 216. If a suitable placement strategy 112 can be identified, the identification component 214 returns the selected placement strategy 112 in response to the request 216 at operation 316. A cost associated with executing a virtual machine instance or another type of workload utilizing the selected placement strategy 112 might also be returned in response to the request 216. The routine 300 then proceeds from operation 316 to operation 318, where it ends.

Figure 4:
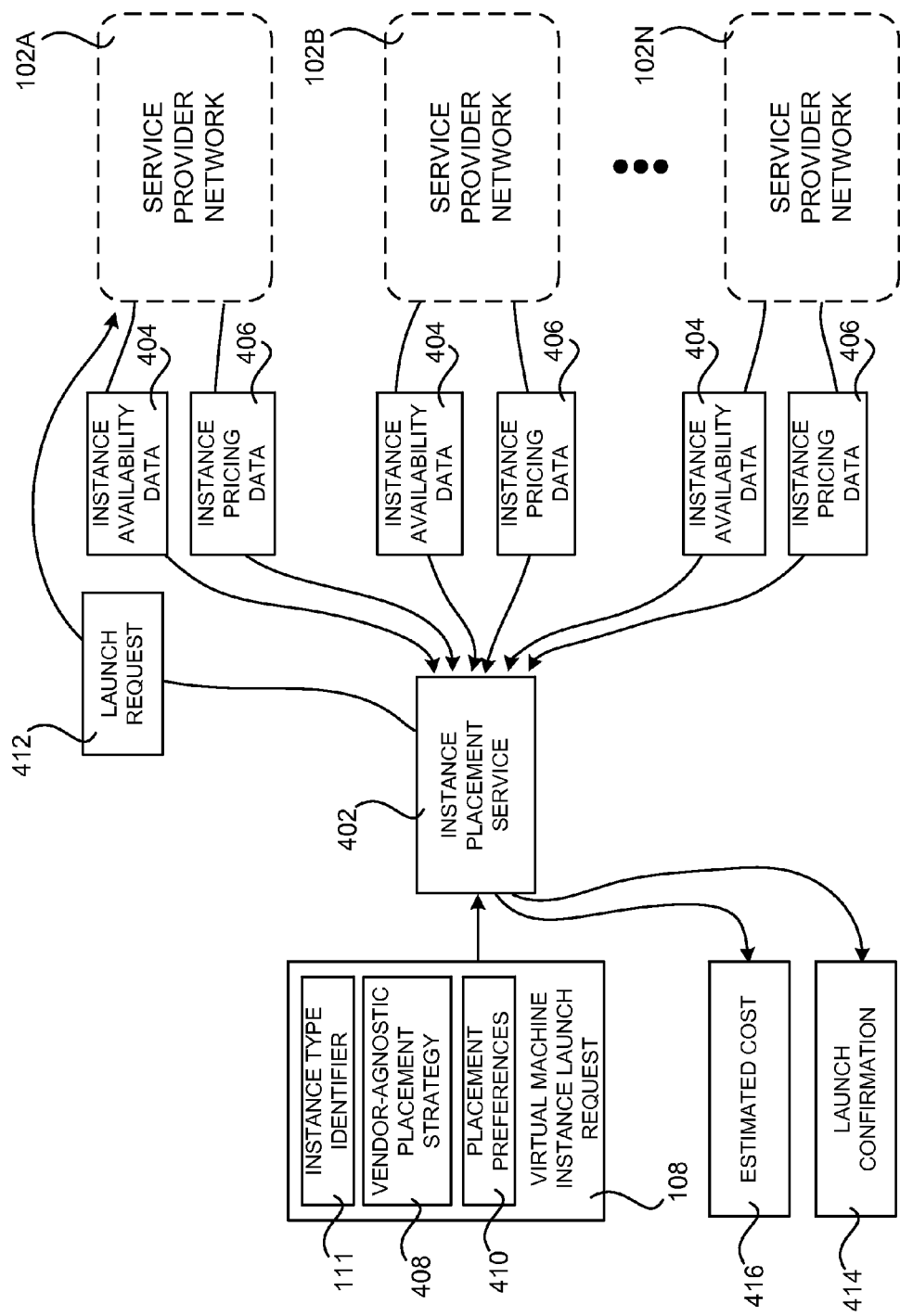
FIG. 4 is a system diagram showing aspects of one mechanism disclosed herein for utilizing a vendor-agnostic placement strategy to select a service provider network for instantiating a virtual machine instance, according to one embodiment disclosed herein.

FIG. 4 is a system diagram showing aspects of one mechanism disclosed herein for utilizing a vendor-agnostic placement strategy 408 to select a service provider network 102 for instantiating a virtual machine instance 104, according to one embodiment disclosed herein. In the embodiment shown in FIG. 4, different vendors operate different service provider networks 102A-102N. Each of the service provider networks 102A-102N might provide some or all of the functionality described above for on-demand usage of computing resources, such as virtual machine instances 104. The service provider networks 102A-102N might, however, provide different types of computing resources having different configurations and that are implemented utilizing different hardware platforms. The vendors operating the service provider networks 102A-102N might also charge different prices for the use of the computing resources.

In the embodiment shown in FIG. 4, an instance placement service 402 may be utilized to assist a user with the selection of a service provider network 102A-102N for executing a virtual machine instance 104 or other type of computing resource. In order to provide this functionality, the instance placement service 402 retrieves instance availability data 404 and instance pricing data 406 for each of the service provider networks 102A-102N. The instance availability data 404 describes the virtual machine instance 104 types and/or hardware platforms for executing the virtual machine instance types available from each service provider network 102A-102N. The instance availability data 404 might also describe other types of available computing resources available from each service provider network 102.

The instance pricing data 406 describes the price for utilizing the various virtual machine instance types available from each service provider network 102. The instance placement service 402 might retrieve the instance availability data 404 and the instance pricing data 406 prior to receiving a request 108 to launch a virtual machine instance 104, and store the data 404 and 406 for future use. Alternately, the instance placement service 402 might obtain the instance availability data 404 and the instance pricing data 406 just following the receipt of a request 108 to launch a virtual machine instance 104.

In another embodiment, the instance placement service 402 might quickly launch the virtual machine instance 104 on one of the service provider networks 102. Following the launch, the instance placement service 402 might then obtain the instance availability data 404 and the instance pricing data 406. The instance availability data 404, the instance pricing data 406, and the vendor-agnostic placement strategy 408 might then be utilized to select a service provider network 102 for the virtual machine instance 104 in the manner described below. If the selected service provider network 102 is not the same as the service provider network 102 that the virtual machine instance 104 was launched upon, the virtual machine instance 104 might be migrated to the selected service provider network 102. Various mechanisms might be utilized to migrate the virtual machine instance 104 including, but not limited to, a "live" migration in which the state of the executing virtual machine instance 104 is saved, migrated, and re-started, and a "reboot" migration wherein the execution virtual machine instance 104 is shut down prior to migration. Other migration technologies might also be utilized.

As shown in FIG. 4, the instance placement service 402 might also receive a launch request 108. In this embodiment, the launch request 108 includes a vendor-agnostic placement strategy 408. As discussed briefly above, the vendor-agnostic placement strategy 408 is a placement strategy 112 that is defined in a manner that is independent (i.e. agnostic) of any particular service provider (i.e. vendor) and/or service provider network 102. The vendor-agnostic placement strategy 408 might be defined utilizing an appropriate extensible markup language ("XML") schema or in another fashion using other technologies.

In some implementations, the launch request 108 also includes one or more placement preferences 410. The placement preferences 410 might specify a preferred service provider network 102 for launching the requested virtual machine instance 104. The placement preferences 410 might also specify that a certain service provider network 102, or networks 102, not be utilized for launching the requested virtual machine instance 104. Other types of placement preferences 410 might also be specified in the launch request 108.

In response to receiving a launch request 108, the instance placement service 402 may utilize the instance availability data 404, the instance pricing data 406, and the vendor-agnostic placement strategy 408 to select a service provider network 102A-102N for launching the requested virtual machine instance 104. In one embodiment, the service provider network 102 that is selected for launching the virtual machine instance 104 is the service provider network 102 that can satisfy the parameters of the vendor-agnostic placement strategy 408 and that can also execute the virtual machine instance 104 at the lowest cost. The service provider network 102 for instantiating the requested virtual machine instance 104 might also be selected using the instance availability data 404, the instance pricing data 406, and/or the vendor-agnostic placement strategy 408 in other ways in other embodiments. In this regard, it should be appreciated that other factors might also be utilized when selecting a service provider network 102 for instantiating the requested virtual machine instance 104 such as, but not limited to, the geographic location, network bandwidth and/or latency, service history, customer-supplied ratings, and/or historical up time of each service provider network 102.

In order to select a service provider network 102, the instance placement service 402 might have to translate the vendor-agnostic placement strategy 408 into a vendor-specific placement strategy. In this regard, the launch request 108 might optionally specify vendor-specific equivalents of the vendor-agnostic placement strategy 408 to assist with this translation. In a similar fashion, the instance placement service 402 might have to perform various processes to identify generally equivalent instance types available from each of the service provider networks 102A-102N. The instance placement service 402 might also perform other types of processes in order to identify a service provider network 102 that can satisfy the various parameters set forth in a vendor-agnostic placement strategy 408.

Once a service provider network 102 has been selected, the instance placement service 402 may transmit a launch request 412 to the selected service provider network 102 to instantiate the requested virtual machine instance 104. In the example shown in FIG. 4, for instance, the service provider network 102A has been selected and, accordingly, the instance placement service 402 has transmitted the launch request 412 to an appropriate component, such as the deployment component 110, in the service provider network 102A. The launch request 412 might be transmitted to an appropriate API or other type of interface exposed by the selected service provider network 102A.

The selected service provider network 102A may then utilize the supplied vendor-agnostic placement strategy 408 to instantiate the requested virtual machine instance 104 in the service provider network 102A. In some embodiments, the instance placement service 402 might also transmit a launch confirmation 414 to the sender of the launch request 108 following the launch of the requested instance in the selected service provider network 102A. The instance placement service 402 might also transmit an estimated cost 416 for executing the requested instance 104 in the selected service provider network 102 to the sender of the launch request 108. Other types of information might also be returned to the sender of the launch request 108 in other embodiments.

In one implementation, a vendor-agnostic placement strategy 408 might be submitted directly to each service provider network 102A-102N. In this implementation, a component in each service provider network 102A-102N may receive the vendor-agnostic placement strategy 408 and, in response thereto, return an indication as to whether the service provider network 102 has appropriate hardware platforms to satisfy the vendor-agnostic placement strategy 408. If the service provider network 102 does have appropriate hardware platforms, instance pricing data 406 might also be returned indicating the estimated cost for utilizing the service provider network 102 to instantiate resources defined by the vendor-agnostic placement strategy 408. The customer submitting the vendor-agnostic placement strategy 408 can then utilize this data to decide whether or not to utilize a particular service provider network 102.

It should be appreciated that the instance placement service 402 might be operated by an entity that also operates one of the service provider networks 102A-102N. In this scenario, the instance placement service 402 might be operated on computing resources operating within one of the service provider networks 102A-102N. In other embodiments, the instance placement service 402 is operated by a third-party that is not related to the operators of the service provider networks 102A-102N. The instance placement service 402 might also be operated within a network owned by a customer of one or more of the service provider networks 102A-102N. The instance placement service 402 might also be operated by other entities in other networks in other embodiments.

Figure 5:
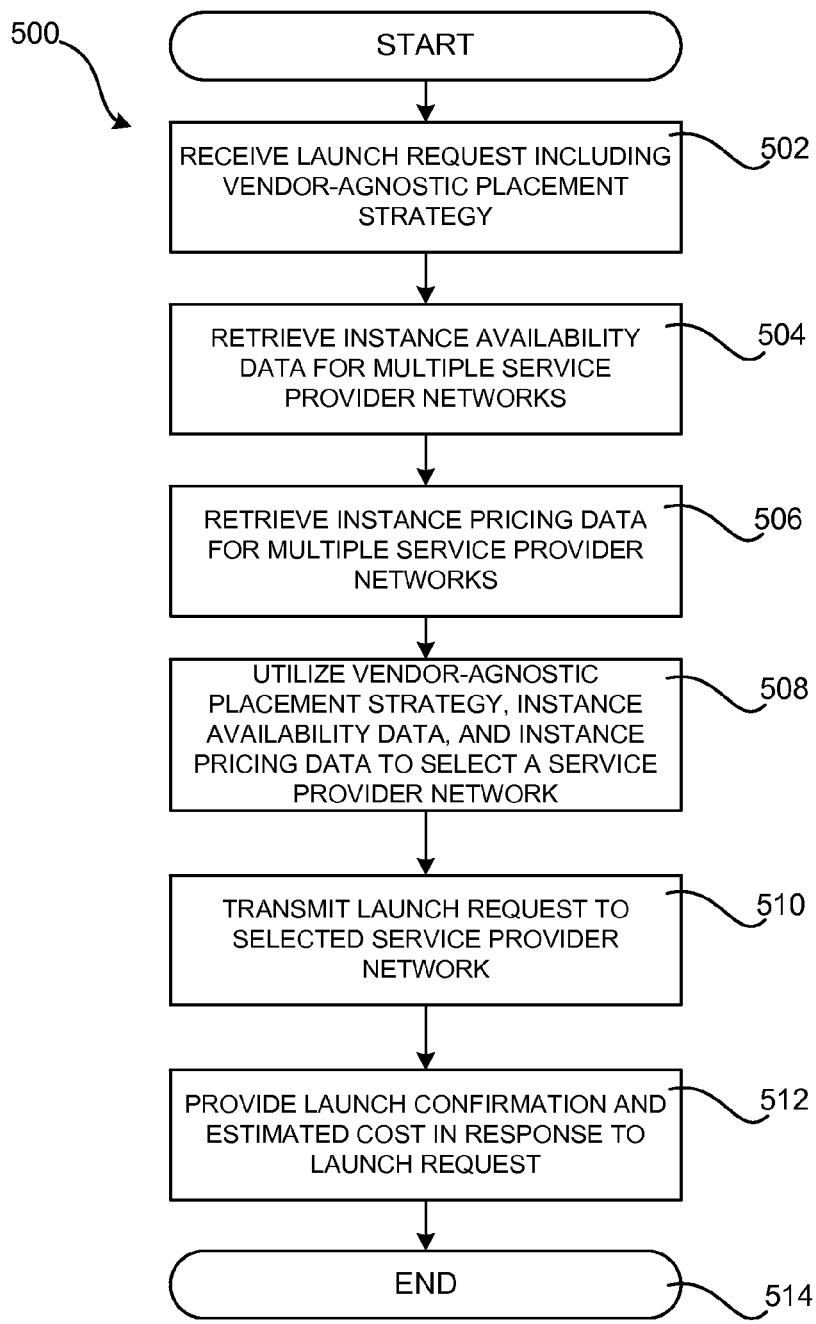
FIG. 5 is a flow diagram showing one illustrative routine for utilizing a vendor-agnostic placement strategy to select a service provider network for instantiating a virtual machine instance, according to one embodiment disclosed herein.

FIG. 5 is a flow diagram showing one illustrative routine 500 for utilizing a vendor-agnostic placement strategy 408 to select a service provider network 102 for instantiating a virtual machine instance, according to one embodiment disclosed herein. The routine 500 begins at operation 502, where the instance placement service 402 receives a launch request 108 that includes a vendor-agnostic placement strategy 408. The routine 500 then proceeds from operation 502 to operation 504, where the instance placement service 402 retrieves the instance availability data 404 from the service provider networks 102A-102N. As mentioned above, the instance placement service 402 might retrieve the instance availability data 404 at the time a launch request 108 is received (as shown in FIG. 5) or prior to the time a launch request 108 is received. If the instance availability data 404 is retrieved prior to the time a launch request 108 is received, the instance availability data 404 might be cached in an appropriate data store for use when a launch request 108 is received.

From operation 504, the routine 500 proceeds to operation 506, where the instance placement service 402 retrieves the instance pricing data 406 from the service provider networks 102A-102N. As mentioned above, the instance placement service 402 might retrieve the instance pricing data 406 at the time a launch request 108 is received (as shown in FIG. 5) or prior to the time a launch request 108 is received. If the instance pricing data 406 is retrieved prior to the time a launch request 108 is received, the instance pricing data 406 might be cached in an appropriate data store for use when a launch request 108 is received.

From operation 506, the routine 500 proceeds to operation 508, where the instance placement service 402 utilizes the instance availability data 404, the instance pricing data 406, and the vendor-agnostic placement strategy 408 to select a service provider network 102A-102N for launching the virtual machine instance 104 specified in the launch request 108. As mentioned above, the service provider network 102 may be selected for launching the virtual machine instance 104 that can both satisfy the parameters set forth in the vendor-agnostic placement strategy 408 and that can also execute the virtual machine instance 104 at the lowest cost (as compared to the other service provider networks 102). The service provider network 102 for instantiating the virtual machine instance 104 requested in the launch request 108 might also be selected using the instance availability data 404, the instance pricing data 406, and/or the vendor-agnostic placement strategy 408 in other ways in other embodiments.

From operation 508, the routine 500 proceeds to operation 510, where the instance placement service 402 transmits a launch request 412 to the service provider network 102 selected to instantiate the requested virtual machine instance 104. In response thereto, the selected service provider network 102 utilizes the vendor-agnostic placement strategy 408 to instantiate the new virtual machine instance 104. At operation 512, the instance placement service 402 might also provide a launch confirmation 414 and/or an estimated cost 416 to the sender of the launch request 108. From operation 512, the routine 500 proceeds to operation 514, where it ends.

Figure 6:
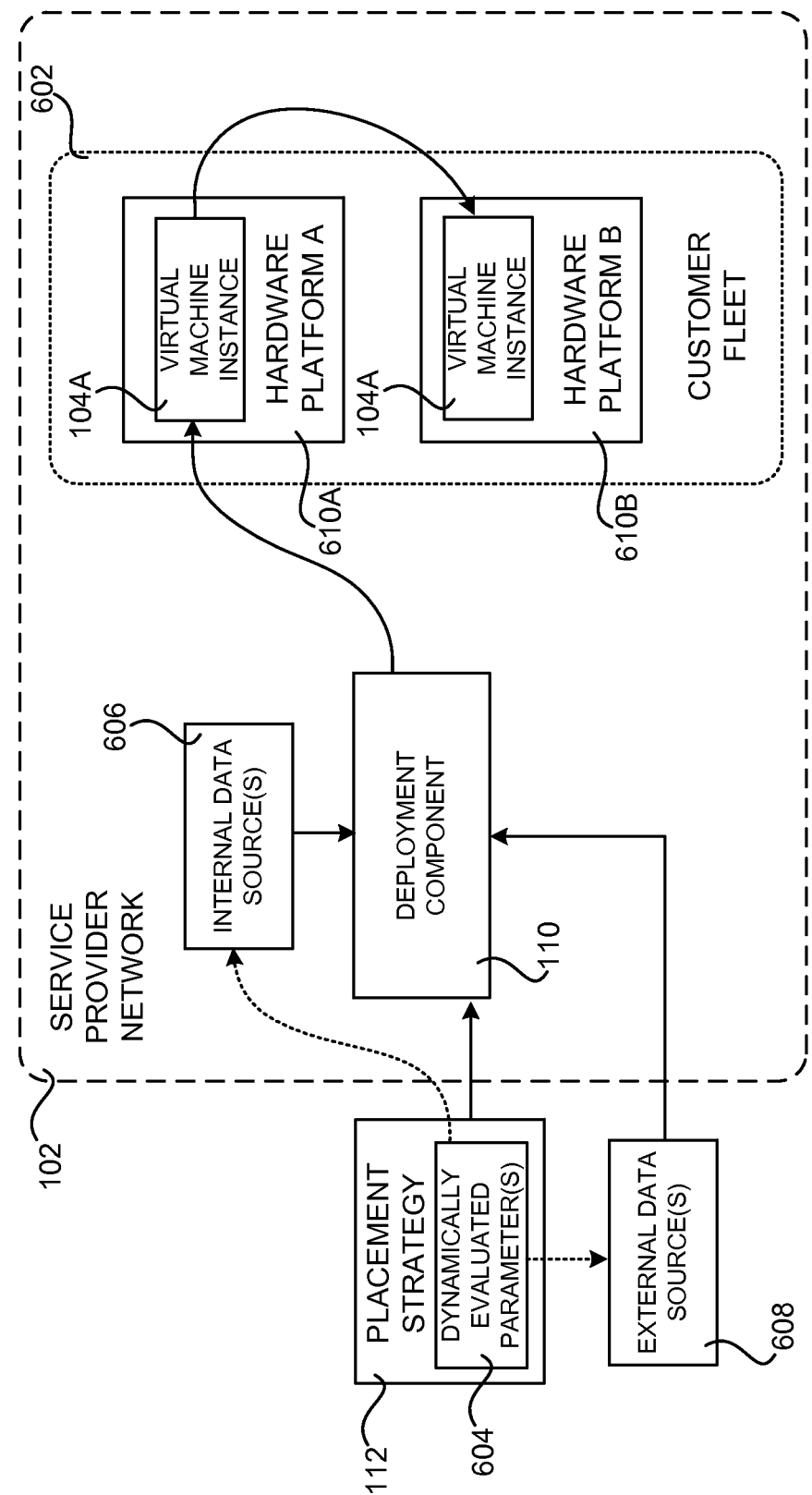
FIG. 6 is a system diagram showing aspects of one mechanism disclosed herein for utilizing a placement strategy that includes dynamically evaluated parameters to modify virtual machine instances in a customer fleet, according to one embodiment disclosed herein.

FIG. 6 is a system diagram showing aspects of one mechanism disclosed herein for utilizing a placement strategy 112 that includes dynamically evaluated parameters 604 to modify virtual machine instances 104 in a customer fleet 602, according to one embodiment disclosed herein. In the embodiment illustrated in FIG. 6, a placement strategy 112 might be defined that includes dynamically evaluated parameters 604. As discussed briefly above, dynamically evaluated parameters 604 are parameters that are dynamically defined at the time that the placement strategy 112 is evaluated. For example, values for one or more dynamically evaluated parameters 604 might be retrieved from a data source 606 internal to the service provider network 102 at the time the placement strategy is evaluated 112. Values retrieved from a data source 606 internal to the service provider network 102, might include for example, values relating to the current pricing of virtual machine instances 104 available within the service provider network 102. The deployment component 110 may retrieve data from the internal data source 606 and/or the external data source 608 utilizing API calls or other appropriate mechanisms.

In some implementations, values for one or more dynamically evaluated parameters 604 might also be retrieved from a data source 608 external to the service provider network 102 at the time a placement strategy 112 is evaluated. In some embodiments, the external data source 608 might be operated by, and provide values related to, a customer of the service provider network 102. For example, the data source 608 might expose data relating to the operation of an on-premises network by the customer. In this way, a placement strategy 112 could be defined that includes dynamically evaluated parameters 604 relating to the status of the customer's on-premises network. Specifically, a placement strategy 112 could be defined that instantiates virtual machine instances 104 in the service provider network 102 if the utilization of the customer's on-premises network exceeds a certain threshold. Similarly, a placement strategy 112 could be defined that descales virtual machine instances 104 in the service provider network 102 if the utilization of the customer's on-premises network falls below a certain threshold. Other types of placement strategies 112 might also be defined that include other types of data available from external data sources 608.

Once the values for the dynamically evaluated parameters 604 for a placement strategy 112 have been received, the placement strategy 112 can be evaluated. Depending upon the results of the evaluation, various modifications might be made to a fleet 602 of virtual machine instances 104 operated by a customer of the service provider network 102. For example, and as shown in FIG. 6, a virtual machine instance 104A executing on a particular hardware platform 610A might be migrated to a different hardware platform 610B. As discussed above, various techniques might be utilized to perform such a migration including, but not limited to, live and reboot migration. In another example, a new virtual machine instance 104 might be added to the fleet 602 that is executed on a hardware platform specified by the placement strategy 112 containing the dynamically evaluated parameters 604. Other types of modifications to the fleet 602 might also be made based upon an evaluation of the dynamically evaluated parameters 604.

In some embodiments, the values for the dynamically evaluated parameters 604 are periodically updated and utilized to re-evaluate the placement strategy 112. The virtual machine instances 104 in the customer fleet 602 may then be modified accordingly depending upon the results of the evaluation of the placement strategy 112. In this way, modifications to the instance in a customer fleet 602 can be made on an ongoing basis according to the parameters set forth in the placement strategy 112. For example, virtual machine instances 104 in the customer fleet 602 may be continually migrated to different hardware platforms depending upon the data retrieved from the internal data source 606 (e.g. cost) and/or the data retrieved from the external data source 608 (e.g. the status of an on-premise customer network). The various migration techniques described above may be utilized in this regard. Certain embodiments might also provide placement strategies 112 that account for real-time pricing trends dynamically by leveraging historic and/or real-time constraint parameters known to have cyclic performance variations.

Figure 7:
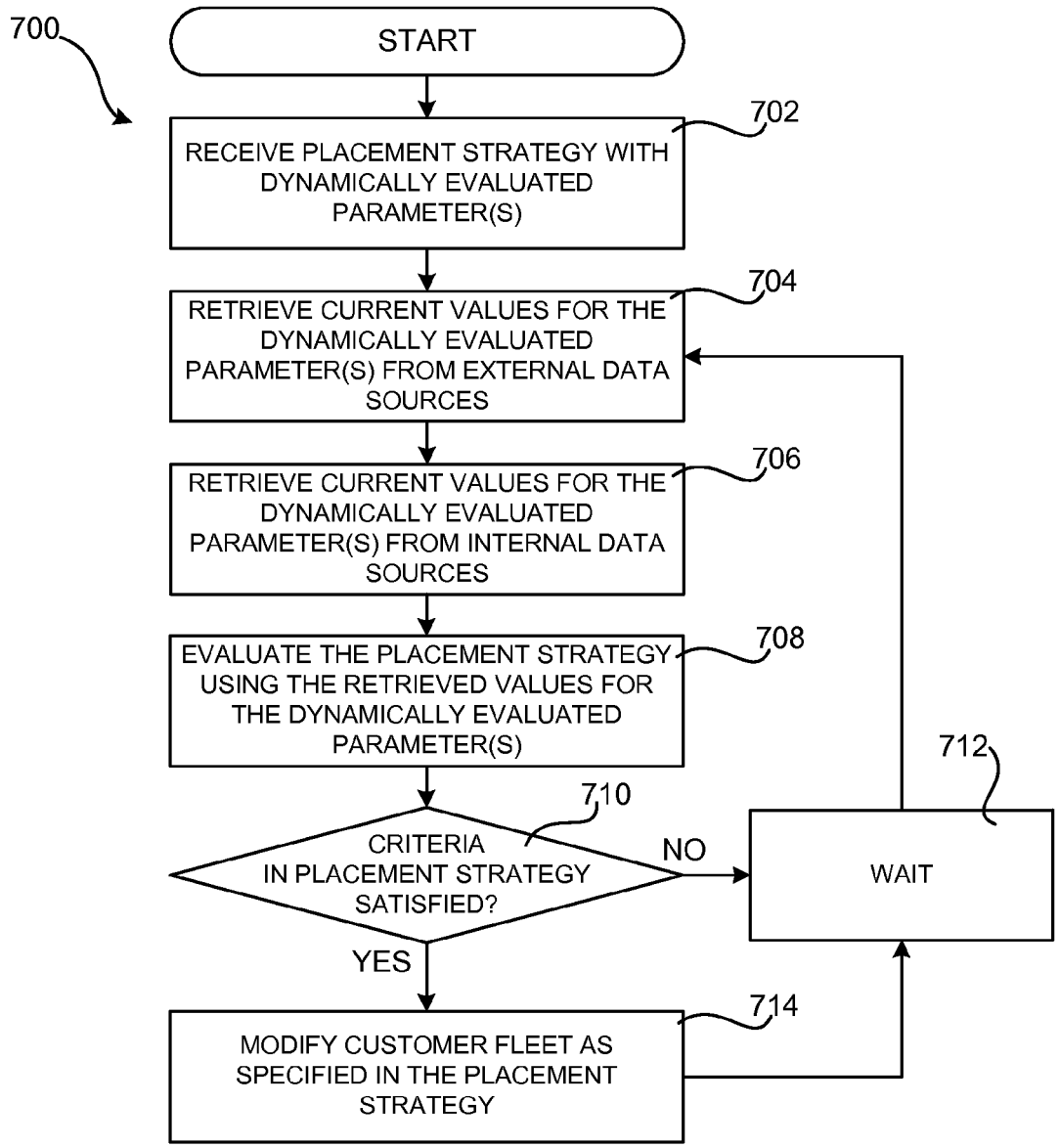
FIG. 7 is a flow diagram showing one illustrative routine for utilizing a placement strategy that includes dynamically evaluated parameters to modify virtual machine instances in a customer fleet, according to one embodiment disclosed herein.

FIG. 7 is a flow diagram showing one illustrative routine 700 for utilizing a placement strategy 112 that includes dynamically evaluated parameters 604 to modify virtual machine instances 104 in a customer fleet 602, according to one embodiment disclosed herein. The routine 700 begins at operation 702, where deployment component 110 receives a placement strategy 112 with dynamically evaluated parameters 604. From operation 702, the routine 700 proceeds to operation 704, where the deployment component 110 retrieves values, if specified, from any external data sources 608. The routine 700 then proceeds from operation 704 to operation 706, where the deployment component 101 retrieves values, if specified, from any internal data sources 606.

From operation 706, the routine 700 proceeds to operation 708, where the deployment component 110 evaluates the placement strategy 112 utilizing the values retrieved for the dynamically evaluated parameters 604 from the internal and external data sources 606 and 608, respectively. If, based upon the retrieved values, the deployment component 110 determines that the criteria in the placement strategy 112 have not been satisfied, the routine 700 proceeds from operation 710 to operation 712. At operation 712, some period of time may be permitted to elapse before the routine 700 proceeds back to operation 704 where, after some period of time, the values for the dynamically evaluated parameters 604 may again be retrieved and evaluated in the manner described above.

If, at operation 710, the deployment component 110 determines that the criteria set forth in the placement strategy 112 have been satisfied, the routine 700 proceeds from operation 710 to operation 714. At operation 714, the deployment component 110 causes one or more modifications to be made to the fleet 602. For instance, and as described above, the deployment component 110 might migrate a virtual machine instance 104 from one hardware platform to a different hardware platform in the manner described above. Alternately, the deployment component 110 might instantiate a new virtual machine instance 104 or other type of computing resource in the fleet 602 using a hardware platform specified in the placement strategy 112. From operation 714, the routine 700 proceeds to operation 712, where the retrieval, evaluation, and modifications described above may be performed repeatedly.

It should be appreciated that although a polling mechanism has been illustrated and described above with regard to FIG. 7, other types of mechanisms might also be utilized to determine if changed values are available for the dynamically evaluated parameters 604. For example, in other implementations, the deployment component 110 might register to receive event notifications when the dynamically evaluated parameters 604 change. In this way, the polling described above with regard to FIG. 7 might be avoided. Other mechanisms might also be utilized.

Figure 8:
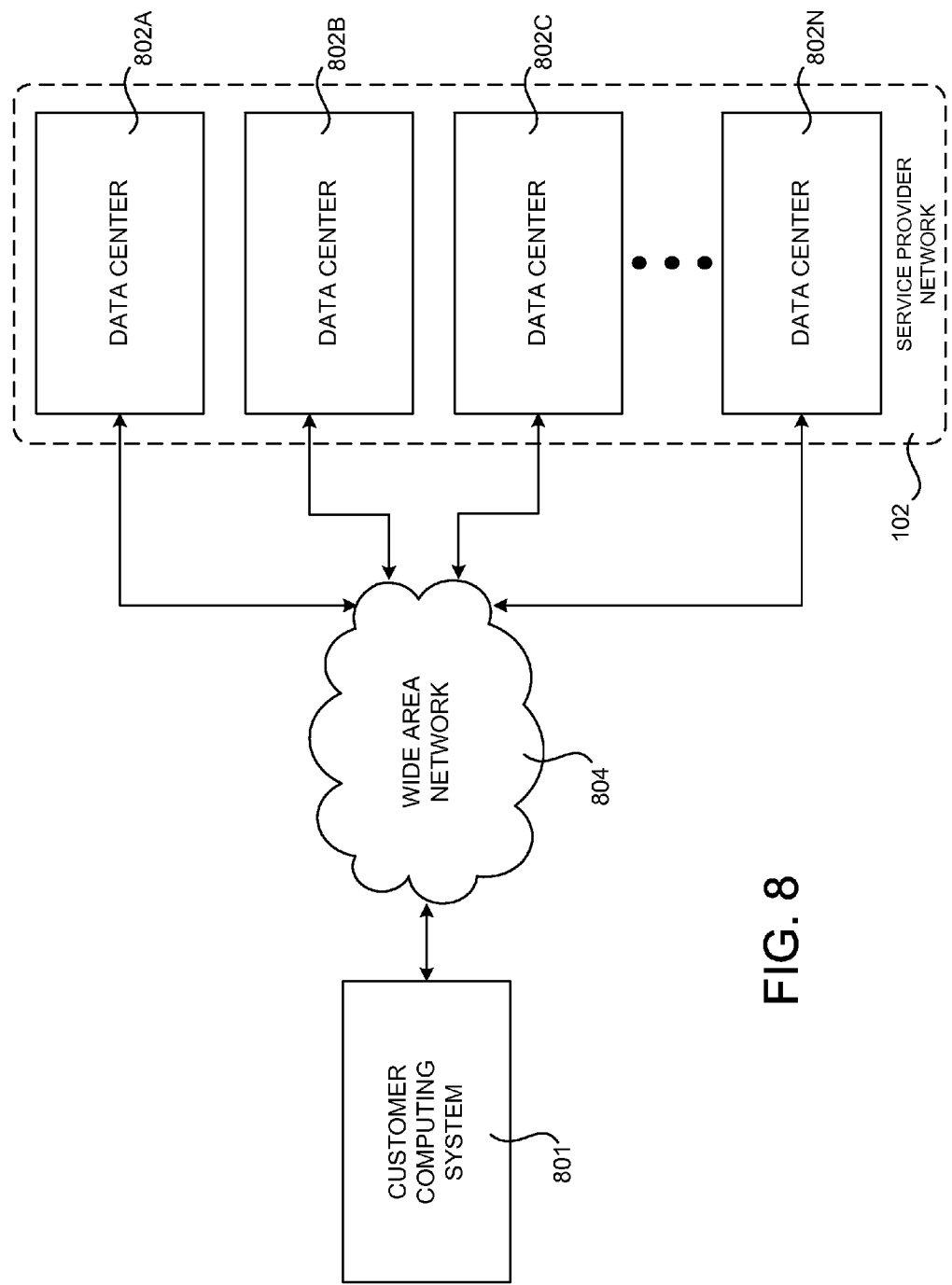
FIG. 8 is a system and network diagram that shows one illustrative operating environment for the embodiments disclosed herein that includes a service provider network configured to provide functionality for implementing virtual machine instances and other types of computing resources, according to one embodiment disclosed herein.

FIG. 8 is a system and network diagram that shows one illustrative operating environment for the embodiments disclosed herein that includes a service provider network 102 that may be configured to provide the functionality described above for user-influenced placement of virtual machines. As discussed briefly above, the service provider network 102 can provide computing resources on a permanent or an as-needed basis. The computing resources provided by the service provider network 102 may include various types of computing resources, such as data processing resources, data storage resources, networking resources, data communication resources, and the like.

Each type of computing resource may be general-purpose or may be available in a number of specific configurations. For example, and as described briefly above, data processing resources may be available as virtual machine instances 104 in a number of different configurations. The virtual machine instances 104 may be configured to execute applications, including Web servers, application servers, media servers, database servers, and other types of applications. Data storage resources may include file storage devices, block storage devices, and the like.

As also mentioned briefly above, the computing resources provided by the service provider network 102 are enabled in one implementation by one or more data centers 802A-802N (which may be referred to herein singularly as "a data center 802" or in the plural as "the data centers 802"). The data centers 802 are facilities utilized to house and operate computer systems and associated components. The data centers 802 typically include redundant and backup power, communications, cooling, and security systems. The data centers 802 might also be located in geographically disparate locations. One illustrative configuration for a data center 802 that implements aspects of functionality disclosed herein for user-influenced placement of virtual machines will be described below with regard to FIG. 9.

The customers and other users of the service provider network 102 may access the computing resources provided by the service provider network 102 over a WAN 804 using a suitable customer computing system 801. Although a WAN 804 is illustrated in FIG. 8, it should be appreciated that a local-area network ("LAN"), the Internet, or any other networking topology known in the art that connects the data centers 802 to remote customers and other users may be utilized. It should also be appreciated that combinations of such networks might also be utilized.

Figure 9:
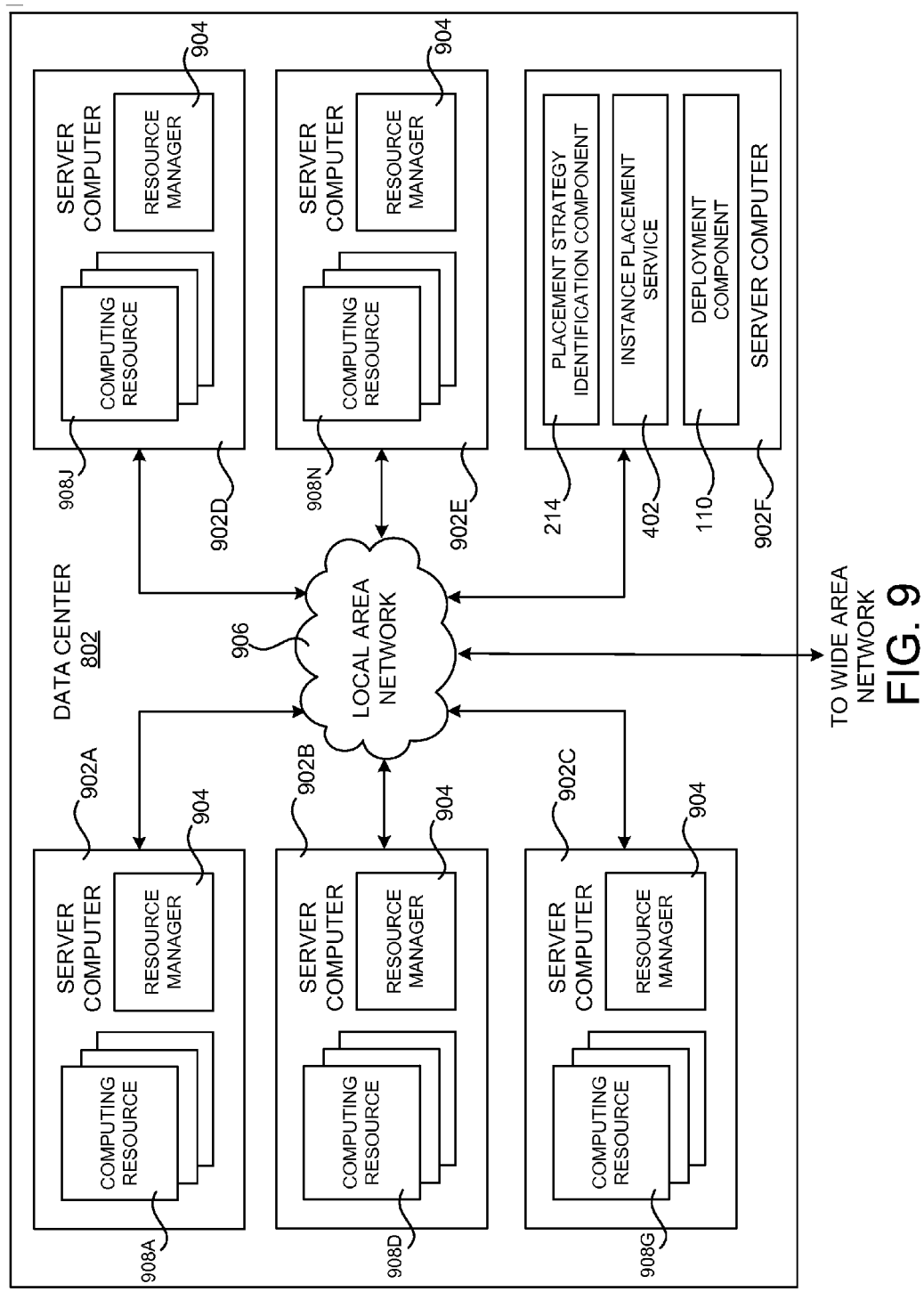
FIG. 9 is a computing system diagram that illustrates one configuration for a data center that implements aspects of the concepts and technologies disclosed herein for user-influenced placement of virtual machine instances, according to one embodiment disclosed herein.

FIG. 9 is a computing system diagram that illustrates one configuration for a data center 802 that implements aspects of the concepts and technologies disclosed herein for user-influenced placement of virtual machines, according to one embodiment disclosed herein. The example data center 802 shown in FIG. 9 includes several server computers 902A-902F (which may be referred to herein singularly as "a server computer 902" or in the plural as "the server computers 902") for providing computing resources such as those described above.

The server computers 902 may be standard tower or rack-mount server computers configured appropriately for providing the computing resources described herein. For example, in one implementation the server computers 902 are configured to provide the computing resources 908A-908N. As mentioned above, the computing resources 908 might be data processing resources such as virtual machine instances 104, data storage resources, database resources, networking resources, and others. Some of the servers 902 might also be configured to execute a resource manager 904 capable of instantiating and/or managing the computing resources. In the case of virtual machine instances 104, for example, the resource manager 904 might be a hypervisor or another type of program configured to enable the execution of multiple virtual machine instances 104 on a single server computer 902, for example.

The data center 902 shown in FIG. 9 also includes a server computer 902F that may be reserved for executing various software components for managing the operation of the data center 802, the server computers 902, and the computing resources. In some implementations, such as those described above, the server computer 902F might also be configured to execute the placement strategy identification component 214, the instance placement service 402, the deployment component 110, and/or the other software components described herein. Other computing systems within the data center 802 might also be utilized to execute these and other components. Other configurations might also be utilized.

In the example data center 802 shown in FIG. 9, an appropriate LAN 906 is utilized to interconnect the server computers 902A-902F. The LAN 906 is also connected to the WAN 804 illustrated in FIG. 8. It should be appreciated that the configuration and network topology illustrated in FIGS. 1-9 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 802A-802N, between each of the server computers 902A-902F in each data center 802, and, potentially, between computing resources in each of the data centers 802. It should be appreciated that the data center 802 described with respect to FIG. 9 is merely illustrative and that other implementations might be utilized.

Figure 10:
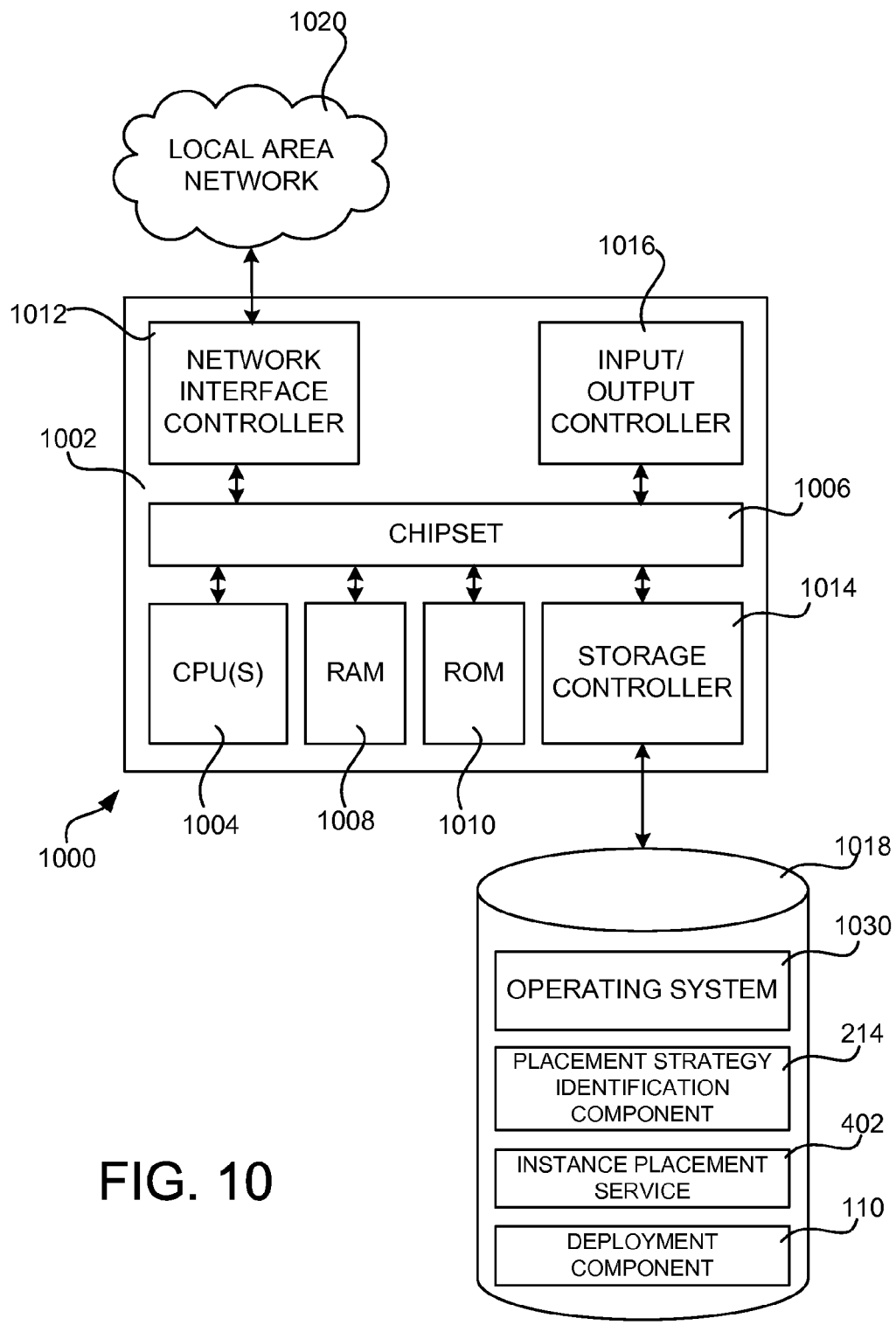
FIG. 10 is a computer architecture diagram showing an illustrative computer hardware architecture for implementing a computing device that might be utilized to implement aspects of the various embodiments presented herein.

FIG. 10 shows an example computer architecture for a computer 1000 capable of executing the program components described above for user-influenced placement of virtual machine instances 104. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 10 may be utilized to implement the various components described above with regard to FIGS. 1-6.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a NIC 1012, such as a gigabit Ethernet adapter. The NIC 1012 is capable of connecting the computer 1000 to other computing devices over the network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules, and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage, and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1018 may store other system or application programs and data utilized by the computer 1000, such as the placement strategy identification component 214, the instance placement service 402, the deployment component 110, and/or any of the other software components and data described above. The mass storage device 1018 might also store other programs and data not specifically identified herein.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processing routines described above. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that various technologies for user-influenced placement of virtual machine instances 104 and other types of computing resources have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereupon which, when executed by a computer, cause the computer to:
   store, at a service provider network, a plurality of placement strategies configured for use in influencing placement of virtual machine instances on particular hardware platforms in the service provider network;
   store data associated with at least one placement strategy of the plurality of placement strategies;
   receive, at the service provider network from a client device, a request for a placement strategy suitable for use with an identified virtual machine image;
   in response to receiving the request, search the data to identify a placement strategy, among the plurality of placement strategies, that is suitable for use in identifying a hardware platform in the service provider network upon which to execute the identified virtual machine image; and
   return, from the service provider network to the client device, the identified placement strategy in response to the request,
   wherein the data further comprises user-provided ratings for publishers of the plurality of placement strategies, and wherein the user-provided ratings for the publishers of the plurality of placement strategies are utilized to select the placement strategy suitable for use with the identified virtual machine image.

2. The computer-readable storage medium of claim 1, wherein the data further comprise user-provided ratings for the plurality of placement strategies, and wherein the user-provided ratings for the plurality of placement strategies are utilized to select the placement strategy for use with the identified virtual machine image.

3. The computer-readable storage medium of claim 1, wherein one or more of the stored plurality of placement strategies are provided by a customer of the service provider network.

4. The computer-readable storage medium of claim 1, wherein one or more of the stored plurality of placement strategies are identified through an analysis of data defining historical usage of placement strategies in the service provider network.

5. The computer-readable storage medium of claim 1, having further computer-executable instructions stored thereupon which, when executed by the computer, cause the computer to utilize the identified placement strategy to influence the placement of the identified virtual machine image on a particular hardware platform in the service provider network.

6. A computer-implemented method for sharing placement strategies for use in influencing placement of virtual machine instances on hardware platforms in a service provider network, the method comprising performing computer-implemented operations for:
storing, at one or more servers of the service provider network, a plurality of customer-provided placement strategies provided by one or more customers of the service provider network;
storing, at the one or more servers, data associated with at least one customer-provided placement strategy of the plurality of customer-provided placement strategies;
storing, at the one or more servers, one or more customer-provided ratings of publishers of the plurality of customer-provided placement strategies;
receiving, at the one or more servers from a computing device, a request for a placement strategy for use with a specified computing workload; and
in response to receiving the request, searching the data to identify a customer-provided placement strategy, among the plurality of customer-provided placement strategies, that is suitable for use in identifying a hardware platform in the service provider network upon which to execute the specified computing workload.

7. The computer-implemented method of claim 6, wherein the specified computing workload comprises a virtual machine image.

8. The computer-implemented method of claim 6, further comprising storing one or more customer-provided ratings for the plurality of customer-provided placement strategies.

9. The computer-implemented method of claim 8, wherein the customer-provided ratings for the plurality of customer-provided placement strategies are also utilized to select the placement strategy for use in identifying the hardware platform in the service provider network upon which to execute the specified computing workload.

10. The computer-implemented method of claim 6, wherein the ratings of publishers of the plurality of customer-provided placement strategies are also utilized to select the placement strategy for use in identifying the hardware platform in the service provider network upon which to execute the specified computing workload.

11. The computer-implemented method of claim 6, further comprising storing one or more placement strategies identified through an analysis of data defining historical usage of placement strategies in the service provider network.

12. The computer-implemented method of claim 6, further comprising utilizing the identified placement strategy to influence the placement of the specified computing workload on a particular hardware platform in the service provider network.

13. A computing system for selecting a placement strategy for a computing workload in a service provider network, the system comprising:
one or more computers configured to
receive a request for a placement strategy suitable for use with the computing workload,
in response to receiving the request, search data associated with a plurality of placement strategies shared by customers of the service provider network, and
based at least in part on the search, select a placement strategy, among the plurality of placement strategies, that is suitable for use with the computing workload,
wherein the selected placement strategy is further identified based at least in part upon ratings of publishers of the plurality of placement strategies.

14. The system of claim 13, wherein the one or more computers are configured to utilize the selected placement strategy to influence the placement of the computing workload on a particular hardware platform in the service provider network.

15. The system of claim 14, wherein the computing workload comprises a virtual machine image.

16. The system of claim 13, wherein the selected placement strategy may further be selected from one or more placement strategies identified through an analysis of data defining historical usage of placement strategies in the service provider network.

17. The system of claim 13, wherein the selected placement strategy is further identified based at least in part upon ratings of the plurality of placement strategies.

* * * * *